United States Patent
Sartorius et al.

(10) Patent No.: US 7,366,869 B2
(45) Date of Patent: Apr. 29, 2008

(54) METHOD AND SYSTEM FOR OPTIMIZING TRANSLATION LOOKASIDE BUFFER ENTRIES

(75) Inventors: Thomas Andrew Sartorius, Raleigh, NC (US); Jeffrey Todd Bridges, Raleigh, NC (US); James Norris Dieffenderfer, Apex, NC (US); Victor Roberts Augsburg, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 327 days.

(21) Appl. No.: 11/083,691

(22) Filed: Mar. 17, 2005

(65) Prior Publication Data

US 2006/0212675 A1    Sep. 21, 2006

(51) Int. Cl.
*G06F 12/00* (2006.01)
(52) U.S. Cl. ..................... 711/207; 711/205
(58) Field of Classification Search ............... None
See application file for complete search history.

(56) References Cited

U.S. PATENT DOCUMENTS 6,112,285 A * 8/2000 Ganapathy et al. ......... 711/207

2004/0117594 A1    6/2004  VanderSpek
2004/0215918 A1   10/2004  Jacobs et al.

OTHER PUBLICATIONS

Lee et al. "A dynamic TLB management structure to support different page sizes" Aug. 2000, Proceedings of the Second IEEE Asia Pacific Conference, pp. 299-302.*
Romer et al. "Reducing TLB and memory Overhead Using Online Superpage Promotion" May 1995, ACM Sigarch Compute Architecture News, pp. 176-187.*

* cited by examiner

*Primary Examiner*—Matthew Kim
*Assistant Examiner*—Mehdi Namazi
(74) *Attorney, Agent, or Firm*—Nicholas J. Pauley; John L. Ciccozzi; Thomas R. Rouse

(57) ABSTRACT

A system for optimizing translation lookaside buffer entries is provided. The system includes a translation lookaside buffer configured to store a number of entries, each entry having a size attribute, each entry referencing a corresponding page, and control logic configured to modify the size attribute of an existing entry in the translation lookaside buffer if a new page is contiguous with an existing page referenced by the existing entry. The existing entry after having had its size attribute modified references a consolidated page comprising the existing page and the new page.

14 Claims, 3 Drawing Sheets

METHOD AND SYSTEM FOR OPTIMIZING TRANSLATION LOOKASIDE BUFFER ENTRIES

BACKGROUND

1. Field

The present disclosure relates generally to translation lookaside buffers, and more specifically, to methods and systems for optimizing translation lookaside buffer entries.

2. Background

Many existing computer systems today utilize virtual memory. Virtual memory is a technique that abstracts memory into a large, uniform array of virtual storage, which exceeds memory readily available to the processor. This separation allows a large virtual memory to be provided for programmers when only a smaller physical memory, commonly a semiconductor memory (such as but not limited to RAM or DRAM) hereinafter referred to simply as "memory", is available, thereby freeing programmers from concern over memory storage limitations. As a result, numerous applications can be launched by loading portions of them from higher latency hard drive storage to lower latency memory even though the lower latency memory is not large enough to hold them all. This may be achieved by identifying portions of memory that have not been used recently and copying them back onto the hard drive. This frees up space in memory to load new portions of memory for more immediate use.

In many processing systems today, a central processing unit (CPU) uses virtual memory to execute programs. In such processing systems a virtual address is mapped to a corresponding physical address. Typically, this mapping is performed by a translation lookaside buffer ("TLB"), which is nothing more than a memory that maps the most often used virtual memory page addresses to their corresponding physical memory page addresses.

Commonly, each TLB entry maps one page in memory to a virtual memory page address. This limits the number of addresses that can be represented by each TLB entry. Since maintaining a TLB requires system resources, it would be desirable to provide more efficient methods and systems for optimizing TLB entries by consolidating multiple contiguous page entries into a single entry.

SUMMARY

A processing system is disclosed. The processing system includes a translation lookaside buffer (TLB) configured to map a contiguous block of virtual memory to physical memory, and provide a size attribute indicating the size of the contiguous block of virtual memory, and a processor configured to vary the size of the contiguous block of virtual memory and the corresponding physical memory, and vary the size attribute accordingly.

Another aspect of the processing system is disclosed. The processing system includes a translation lookaside buffer (TLB) configured to store a plurality of entries, each of the entries mapping a contiguous block of virtual memory to physical memory, and each of the entries having a size attribute indicating the size of its respective block of virtual memory, and a processor configured to vary the size of the contiguous block of virtual memory and the corresponding physical memory for one of the entries, and wherein the processor is further configured to vary the size attribute for said one of the entries.

A method of storing a plurality of entries in a translation lookaside buffer (TLB) is disclosed. The method includes mapping a contiguous virtual memory block to physical memory, providing a size attribute indicating the size of the contiguous block of virtual memory, varying the size of the contiguous block of virtual memory and the corresponding physical memory, and varying the size attribute to reflect the change in the contiguous block of virtual memory and the corresponding physical memory.

Another aspect of a method of storing a plurality of entries in a translation lookaside buffer (TLB) is disclosed. The method includes identifying a new block of virtual memory, locating an entry in the TLB having an existing block of virtual memory that is contiguous with the new block of virtual memory, the TLB entry containing a mapping between the existing block of virtual memory and physical memory, and consolidating the new and existing blocks of virtual memory, and their corresponding physical memory, in the TLB entry, the consolidation of the new and existing blocks of virtual memory further comprising adjusting a size attribute to reflect a change in the size from the existing block size of virtual memory to the consolidated block size of virtual memory.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
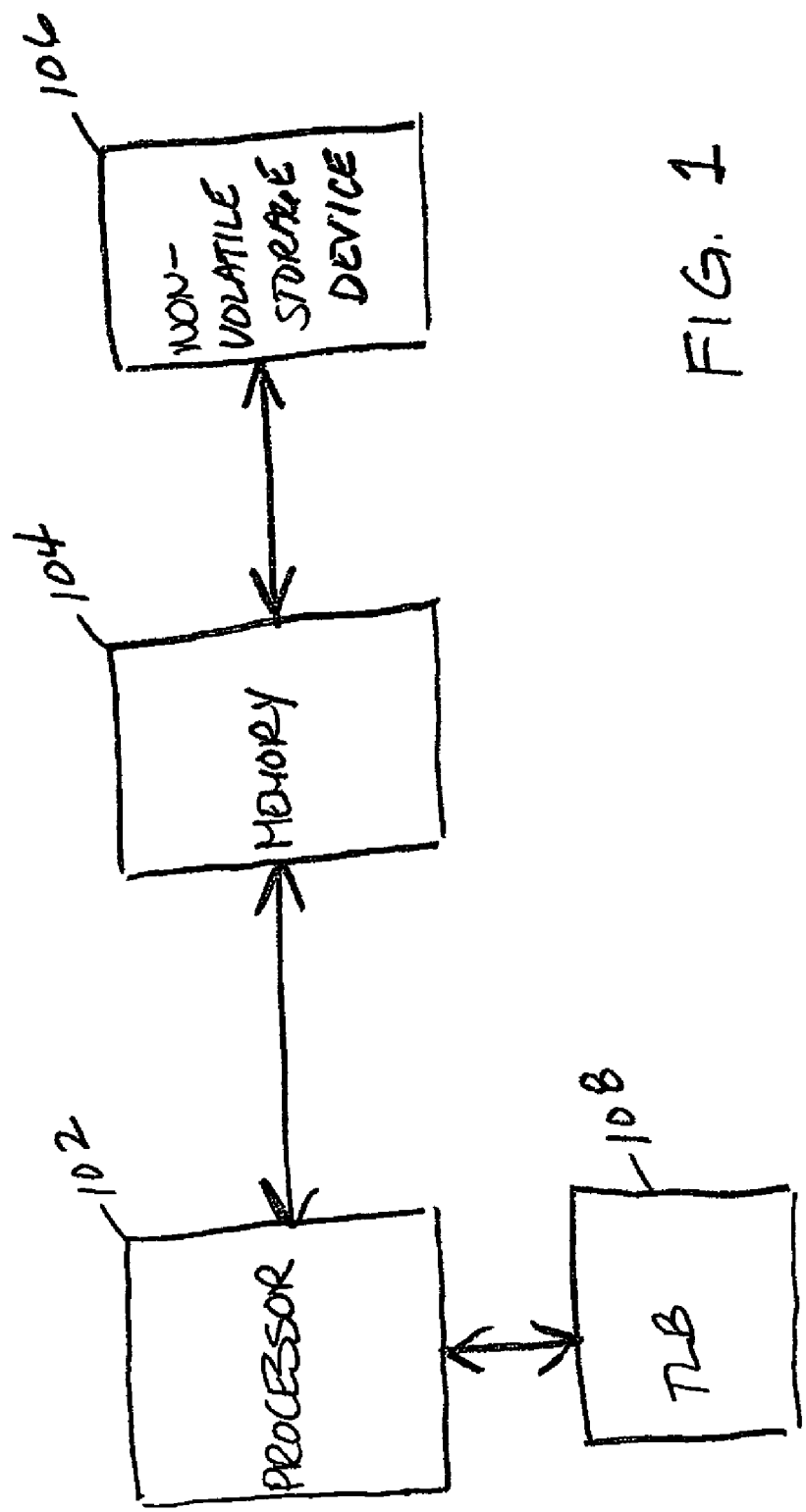
FIG. 1 is a simplified block diagram illustrating a system for optimizing translation lookaside tables according to the present disclosure.

FIG. 1 is a conceptual block diagram illustrating an example of a data processing system 100. The data processing system 100 may be a stand-alone system, or alternatively embedded in a device such as a wired or wireless phone, Personal Digital Assistant (PDA), Personal Computer (PC), laptop, digital camera, game console, pager, modem, video conferencing equipment, or any other suitable device. The data processing system 100 may include a processor 102, such as a microprocessor or other processing entity. The processor 102 may be used as a platform for to run any number of applications including, by way of example, an operating system, a Web browser, an e-mail system, a word processor, as well as other software programs to support video, telephony, and the like.

The processing system 100 may also include memory 104, which holds the program instructions and data needed by the processor 102 to perform its functions. The memory 104 may be implemented with Random Access Memory ("RAM") or other suitable memory, and may serve as the processor's main memory, a L2 cache, or a combination thereof. Program instructions for the various programs launched by the processor 102 may be loaded from a non-volatile storage device 106, such as a hard drive, to memory 104.

A TLB 108 may be used to map memory page addresses from 106, which may comprise for exemplary purposes a non volatile storage device, to corresponding page addresses in memory 104. The TLB may be a relatively small, high-speed cache that is integrated into the processor 102, but is shown separate from the processor 102 for illustration purposes. When the processor 102 needs to access memory 104, it searches the TLB 108 for a virtual memory page address. If the processor 102 finds the virtual memory page address in the TLB 108, a "TLB hit" has occurred. On a TLB hit, the processor 102 retrieves the corresponding physical memory page address from the TLB 108 and provides it to the memory 104 over an address bus 110. The processor 102 can then access the contents of that address in memory 104 to perform either a read or write operation over a data bus 112.

In the event that the processor cannot find the virtual memory page address in the TLB 108, a "TLB miss" has occurred. Various techniques for handling a TLB miss are well known in the art, and therefore, will not be discussed any further except to say that the processor 102 can invoke certain processing functions to determine the physical memory page address required for it to perform its current operation. Once it determines the physical memory page address, the processor can access memory 104, which may or may not require program instructions to be transferred between memory 104 and the non-volatile storage device 106. A new TLB entry may be created in the TLB 108 to handle future access to the same physical memory page address.

Figure 2:
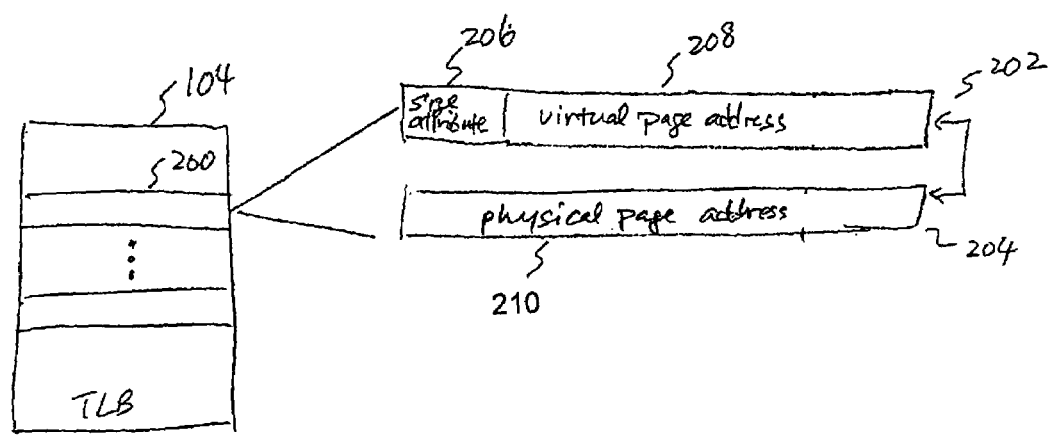
FIG. 2 is a simplified schematic diagram showing a TLB entry according to the present disclosure.

The processor 102 may be configured to dynamically manage the number of pages that can be stored in a single TLB entry. As shown in FIG. 2, each TLB entry 200 in the TLB 108 may include a virtual memory page address 202 and a physical memory page address 204. As explained above, the virtual memory page address 202 is mapped to the physical memory page address 204, which corresponds to a page in memory (not shown). A size attribute 206 may be appended to the virtual memory page address 202. The size attribute 206 may be used to indicate the number of pages represented by each TLB entry.

In at least one embodiment of the data processing system, the processor may be configured to adjust the size attribute for a given TLB entry on a dynamic basis. This may be achieved in a variety of ways. Returning back to FIG. 1, when a TLB miss occurs, the processor 102 invokes certain processing functions to determine the physical memory page address required for it to perform its current operation. However, before the processor 102 creates a new TLB entry, it first determines whether the proposed new entry is contiguous with an existing entry in the TLB 108. Two entries in the TLB 108 are said to be contiguous if both the virtual memory page addresses are contiguous and the physical memory page addresses are contiguous. If the processor 102 determines that contiguity exists with an existing TLB entry, then the two virtual memory pages and the two physical memory pages may be consolidated into a single entry in the TLB 108. The size attribute 206 (see FIG. 2) may be increased to indicate that the virtual memory page address and the corresponding physical memory page address represents two pages in memory 104. Alternatively, if the processor 102 determines that contiguity does not exist with an existing TLB entry, a new TLB entry may be created.

Figure 3:
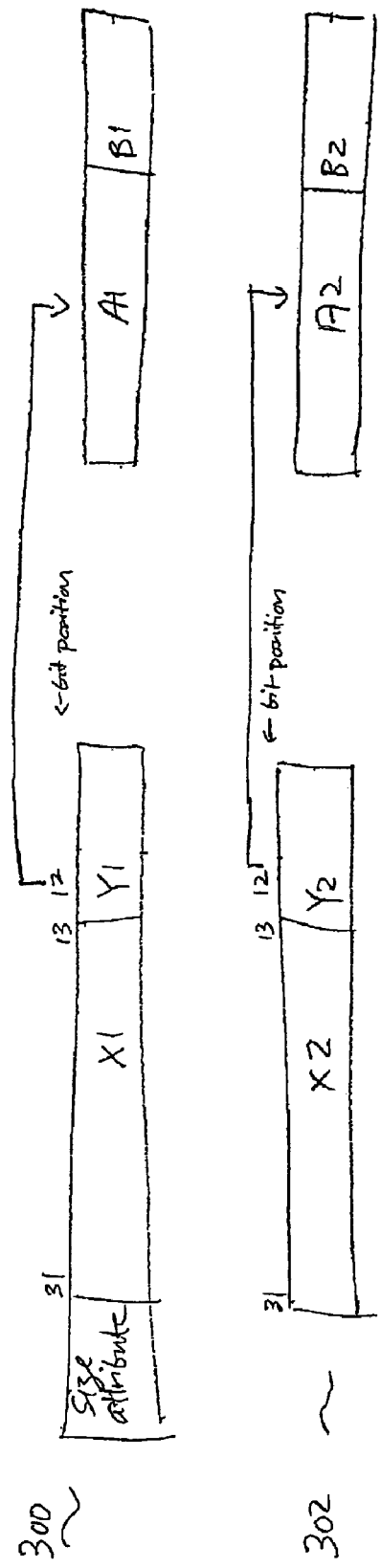
FIG. 3 is a simplified schematic diagram showing a TLB entry and a proposed entry for use in an illustration according to the present disclosure.

The following is an illustrative example showing how the processor 102 optimizes entries in the TLB 108. FIG. 3 shows an existing entry 300 in the TLB and a proposed new entry 302. The existing entry 300 may include a size attribute, a virtual memory page address having a most-significant-bit portion (X1) and a least-significant-bit (Y1), and a corresponding physical memory page address having a most-significant-bit portion (A1) and a least-significant-bit (B1). The size attribute is set to indicate that the TLB entry represents one page of memory. Portion X1 is made up of bits 13-31 and portion Y1 is made up of bit 12. Similarly, the proposed new entry 302 may include a virtual memory page address having a most-significant-bit portion (X2) and a least-significant-bit (Y2), and a corresponding physical memory page address having a most-significant-bit portion (A2) and a least-significant-bit (B2). It should be noted that, for both the existing entry 300 and the proposed entry 302, bits 0-11 correspond to the offset portion of the address and thus are not part of the entry.

The processor determines whether the existing entry 300 and the proposed entry 302 can be optimized as follows. First, the virtual memory page addresses of the existing entry 300 and the proposed entry 302 are compared. If X1=X2 and Y1=Y2, then it is considered a TLB hit. As explained earlier, the processor may then retrieve the corresponding physical memory page address from the TLB and place it on the address bus to access memory. If, on the other hand, X1≠X2 or Y1≠Y2, then it is considered a TLB miss. Assuming that the processor cannot obtain a TLB hit with another TLB entry, it invokes certain processing functions to determine the corresponding physical memory page address. However, before a new TLB entry is created, the proposed entry 302 is checked for contiguity with the existing entries in the TLB.

In the example shown in FIG. 3, the proposed entry 302 is checked for contiguity against the existing entry 300 in response to a TLB miss. This may be achieved with a four step process. First, the virtual memory page addresses are checked for contiguity by comparing X1 to X2, and Y1 to Y2. If X1=X2 and Y1≠Y2, then the virtual memory page addresses are off by one least-significant-bit, and said to be contiguous in virtual memory address space. Second, the physical memory page addresses are checked for contiguity by comparing A1 to A2, and B1 to B2. If A1=A2 and B1≠B2, then the physical memory page addresses are also off by one least-significant-bit, and said to be contiguous in physical memory address space. Third, the virtual and physical memory page address of the existing entry and the proposed entry are then checked to ensure that the proposed entry's virtual and physical memory page addresses are both either higher than or lower than the existing entry's virtual and physical memory page addresses, respectively. Finally, when the existing and proposed entries are to be consolidated into one larger entry, the virtual and physical page address ranges covered by the larger entry are checked to ensure that both address ranges are aligned on the large size boundary. If all these conditions are met, then the existing and proposed entries can be consolidated into a single entry. In the case where the virtual and physical memory page addresses for the proposed entry 302 are higher than that for the existing entry 300, then the two entries can be consolidated by merely increasing the size attribute to indicate that the consolidated TLB entry represent two pages in memory beginning at the virtual and physical memory page addresses of the original entry 300. Alternatively, where the virtual and physical memory page addresses for the proposed entry 302 are lower than that for the existing entry 300, then the two entries can be consolidated by writing the proposed virtual and physical memory page addresses over the existing entry and changing the size attribute to indicate that the consolidated TLB entry represent two pages in memory beginning at the virtual and physical memory page addresses of the new entry 302.

An example will now be provided. Assume that the virtual memory page of the existing entry 300 is 4 KB starting at address "0x0000_0000", and the corresponding physical memory page is 4 KB page starting at address "0x8000_0000". If the virtual memory page for the proposed entry 302 is 4 KB page starting at address "0x0000_1000", and the corresponding physical memory page is 4 KB page starting at address "0x8000_1000", then both entries can be consolidated into an 8 KB region starting at the same addresses as the existing entry. However, if the existing entry's virtual region started at address "0x0000_1000" and its corresponding physical region at address "0x8000_1000", and the proposed entry's virtual region started at address "0x0000_2000" and its corresponding physical region at address "0x8000_2000", then the existing and proposed entries could not be combined, because the resultant 8 KB page would not start at a boundary that is aligned on an 8 KB region.

Consequently, assuming the contiguity check is satisfactory, the size attribute in the existing entry 300 is dynamically changed to 8 KB. The 8 KB size is based on the fact that the existing page is 4 KB and the new page is 4 KB. Hence, consolidating or combining the new page and the existing page results in an 8 KB page. As the foregoing example illustrates, if an existing page that is contiguous to a new page can be located in the TLB, the entry for the existing page can simply be modified and no separate entry need to be added to the TLB for the new page.

In addition, the modified (8 KB) entry may need to have Y1 and B1 both set to "0", if they weren't already both "0". This is performed so that the modified entry correctly reflects the starting address of the new 8 KB page (that is, the lower-numbered of the two contiguous 4 KB pages). However, it should be noted that not all implementations would require this change. Essentially, when a 4 KB entry is converted to an 8 KB entry, bit 12 of the existing entry changes from being the least-significant bit of the virtual page address to effectively being the most-significant bit of the offset (not shown). The offset is used to form the complete physical page address with which to access memory. The offset is not important in the translation or mapping process between virtual page address and physical page address. The size attribute of the entry being 8 KB (rather than 4 KB) indicates that bit 12 is now part of the offset. As such, bit 12 of the virtual page address no longer needs to be considered part of the TLB entry and, hence, does not need to participate in the comparison against subsequent addresses to determine a match. Some implementations can properly and automatically ignore this bit position, in both the virtual and the physical page address portions of the TLB entry, based upon the size attribute. Other implementations may require one or the other, or both, of these bit positions to reflect the lower-numbered page address (in other words, for them to be 0's).

Based on the disclosure and teachings provided herein, it will be appreciated that the foregoing can be extended to accommodate consolidation of larger page sizes. Using the modified entry 300 for further illustration, the entry 300 now references an 8 KB page (since two (2) contiguous 4 KB pages have been consolidated). The processor 102 (see FIG. 1) can be further configured to now search for an entry in the TLB 108 that references another 8K page that is contiguous to the 8K page referenced by the modified entry 300. If it is determined that there is another 8K page contiguous to the 8K page referenced by the modified entry 300, then the size attribute of one of the two existing entries can be modified to now reflect that the page size for that entry is 16K and the remaining entry can be eliminated. As a result, a 16K page is now referenced by a single entry, as opposed to two (2) contiguous 8K pages referenced by two (2) different entries. Expanding the foregoing further, another existing 16K page that is contiguous to the newly consolidated 16K page can also be consolidated to form a 32K page that is referenced by a single entry. The foregoing can be extended to consolidate pages into increasingly larger page sizes.

Optionally, the processor 102 (see FIG. 1) can also be configured to consolidate entries referencing pages with smaller page sizes to create an updated entry referencing a page with a desired page size. The updated entry can then be consolidated with another entry that references a page having the same desired page size. For example, using the modified entry 300 again for illustration, the entry 300 now references an 8K page. The processor 102 (see FIG. 1) can first consolidate two (2) contiguous 4 KB pages to create an 8 KB page referenced by a single entry. The newly created 8 KB page can now be further consolidated with the 8 KB page referenced by the entry 300 to form a 16 KB page referenced by a single entry. Similarly, the processor 102 can then consolidate four (4) contiguous 4 KB pages to form another 16 KB page referenced by another entry. Subsequently, the newly formed 16 KB page can be consolidated with the previously formed 16 KB page to form a 32 KB page. Based on the disclosure and teachings provided herein, a person of ordinary skill in the art will understand how to expand the foregoing to optimize entries in the TLB 108 to cover other larger page sizes according to the present disclosure.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A processing system, comprising:
    a translation lookaside buffer (TLB) configured to map a contiguous block of virtual memory to physical memory, and provide a size attribute indicating the size of the contiguous block of virtual memory; and
    a processor configured to vary the size of the contiguous block of virtual memory and the corresponding physical memory, and vary the size attribute accordingly,
    wherein the processor is further configured to vary the size of the contiguous block of virtual memory by consolidating a first block of virtual memory with a second block of virtual memory in response to a determination that both the first and second blocks of virtual memory are contiguous, and the corresponding of physical memory is also contiguous,
    wherein the processor is further configured to map the first and second blocks of virtual memory to their corresponding blocks of physical memory by mapping the page address for the first block of virtual memory to the page address for its corresponding block of physical memory, the page address for the first block of virtual memory being lower than the page address for the second block of virtual memory.

2. The processing system of claim 1 wherein the processor includes the TLB.

3. The processing system of claim 1 wherein the processor is further configured to consolidate the first and second blocks of virtual memory by varying the size attribute without changing the page address mappings.

4. The processing system of claim 1 wherein the processor is further configured to consolidate the first and second blocks of virtual memory by varying the size attribute and changing the page address for the second block of virtual memory to the page address for the first block of virtual memory, and changing the page address for the block of physical memory accordingly.

5. A processing system, comprising:
    a translation lookaside buffer (TLB) configured to store a plurality of entries, each of the entries mapping a contiguous block of virtual memory to physical memory, and each of the entries having a size attribute indicating the size of its respective block of virtual memory; and
    a processor configured to vary the size of the contiguous block of virtual memory and the corresponding physical memory for one of the entries, and wherein the processor is further configured to vary the size attribute for said one of the entries,
    wherein the processor is further configured to vary the size of the contiguous block of virtual memory for said one of the entries by consolidating the block of virtual memory for said one of the entries with a new block of virtual memory in response to a determination that both such blocks of virtual memory are contiguous, and the corresponding blocks of physical memory are also contiguous,
    wherein the processor is further configured to map the consolidated block of virtual memory to physical memory by mapping the page address for the virtual memory block for said one of the entries to the page address for its corresponding block of physical memory.

6. The processing system of claim 5 wherein the processor includes the TLB.

7. The processing system of claim 5 wherein the processor is further configured to map the consolidated block of virtual memory to physical memory by mapping the page address for the new virtual memory block to the page address for its corresponding block of physical memory.

8. A method of storing a plurality of entries in a translation lookaside buffer (TLB), comprising:
    mapping a contiguous virtual memory block to physical memory;
    providing a size attribute indicating the size of the contiguous block of virtual memory;
    varying the size of the contiguous block of virtual memory and the corresponding physical memory; and
    varying the size attribute to reflect the change in the contiguous block of virtual memory and the corresponding physical memory,
    wherein the size of the contiguous block of virtual memory and the corresponding physical memory is varied by consolidating a first block of virtual memory with a second block of virtual memory in response to a determination that both the first and second blocks of virtual memory are contiguous, and the corresponding physical memory are also contiguous,
    wherein the mapping of the consolidated first and second blocks of virtual memory to physical memory comprises determining that page address for the first block of virtual memory is lower than the page address for the second block of virtual memory, and mapping the page address for the first block of virtual memory to the page address for its corresponding block of physical memory.

9. The method of claim 8 wherein the first and second blocks of virtual memory are consolidated by varying the size attribute without changing the page address mappings.

10. The method of claim 8 wherein the first and second blocks of virtual memory are consolidated by varying the size attribute and changing the page address for the second block of virtual memory to the page address for the first block of virtual memory, and changing the page address for corresponding physical memory accordingly.

11. A method of storing a plurality of entries in a translation lookaside buffer (TLB), comprising:
  identifying a new block of virtual memory;
  locating an entry in the TLB having an existing block of virtual memory that is contiguous with the new block of virtual memory, the TLB entry containing a mapping between the existing block of virtual memory and physical memory; and
  consolidating the new and existing blocks of virtual memory, and their corresponding physical memory, in the TLB entry, the consolidation of the new and existing blocks of virtual memory further comprising adjusting a size attribute to reflect a change in the size from the existing block size of virtual memory to the consolidated block size of virtual memory;
  determining that the corresponding physical memory for the existing block of virtual memory is contiguous with the corresponding memory for the new block of the virtual memory;
  determining that the page address for the existing block of virtual memory is either lower or higher than the page address for the new block of virtual memory, and wherein the existing block of virtual memory is mapped to its corresponding physical memory by mapping the page address of the existing block of virtual memory to the page address of its corresponding physical memory, and the consolidation of the new and existing block of virtual memory further comprises adjusting the size attribute.

12. The method of claim 11 further comprising determining that the consolidated block of virtual memory maps to a block of physical memory represented by physical memory corresponding to the existing and new block of virtual memory.

13. The method of claim 11 further comprising determining that the page address for the existing block of virtual memory is lower than the page address for the new block of virtual memory, and wherein the consolidation of the new and existing block of virtual memory further comprises adjusting the size attribute without changing the page mapping in the entry.

14. The method of claim 11 further comprising determining that the page address for the existing block of virtual memory is higher than the page address for the new block of virtual memory, and wherein the consolidation of the new and existing block of virtual memory further comprises adjusting the size attribute and mapping the page address for the new block of virtual memory to the page address of its corresponding physical memory.

\* \* \* \* \*